United States Patent
Hanzlik

(10) Patent No.: US 6,255,383 B1
(45) Date of Patent: Jul. 3, 2001

(54) INK JET PRINTING COMPOSITIONS

(75) Inventor: Cheryl A. Hanzlik, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/195,523

(22) Filed: Nov. 19, 1998

(51) Int. Cl.$^7$ .............. C08J 69/00; C08K 69/00; C08L 69/00
(52) U.S. Cl. .......... 524/612; 524/368; 524/378; 524/376
(58) Field of Search .................. 524/368, 376, 524/378, 612

(56) References Cited

U.S. PATENT DOCUMENTS

| | | | |
|---|---|---|---|
| 4,680,332 | 7/1987 | Hair et al. | 524/377 |
| 4,726,845 | * 2/1988 | Thompson et al. | 106/25 |
| 5,082,498 | * 1/1992 | Kurtz et al. | 106/499 |
| 5,356,464 | * 10/1994 | Hickman et al. | 106/20 R |
| 5,554,212 | * 9/1996 | Bui et al. | 106/20 R |
| 5,766,325 | * 6/1998 | Gundlach et al. | 106/31.43 |

* cited by examiner

Primary Examiner—Helen L. Pezzuto
(74) Attorney, Agent, or Firm—Judith L. Byorick

(57) ABSTRACT

Disclosed is an ink composition which comprises (a) water, (b) a surfactant selected from those of formula I

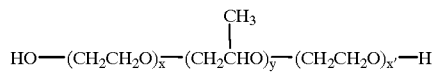

or formula II

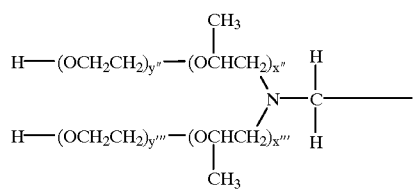

or formula III

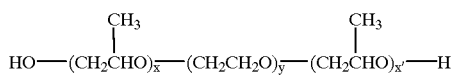

and (c) a dye selected from of (1) C.I. Solvent Black 29; (2) C.I. Solvent Blue 70; (3) C.I. Solvent Blue 25; (4) C.I. Solvent Yellow 82; (5) C.I. Solvent Yellow 29; (6) C.I. Solvent Red 49; or (7) mixtures thereof.

14 Claims, No Drawings

INK JET PRINTING COMPOSITIONS

BACKGROUND OF THE INVENTION

The present invention is directed to compositions suitable for use in ink jet printing processes. More specifically, the present invention is directed to ink compositions comprising emulsions containing specific block copolymers and specific dyes. One embodiment of the present invention is directed to an ink composition which comprises (a) water, (b) a surfactant selected from (1) those of formula I

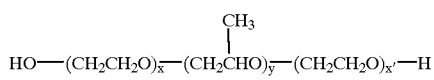

wherein the values of x, x', and y are each such that the molecular weight of the polypropylene oxide block of the compound is from about 900 to about 1,050, the ethylene oxide segments make up from about 45 to about 55 percent by weight of the compound, the average number of propylene oxide groups per molecule is from about 15 to about 18, and the total molecular weight is from about 1,800 to about 2,000; (2) those of formula I wherein the values of x, x', and y are each such that the molecular weight of the polypropylene oxide block of the compound is from about 3,000 to about 3,600, the ethylene oxide segments make up from about 35 to about 45 percent by weight of the compound, the average number of propylene oxide groups per molecule is from about 51 to about 62, and the total molecular weight is from about 5,000 to about 6,000; (3) those of formula II

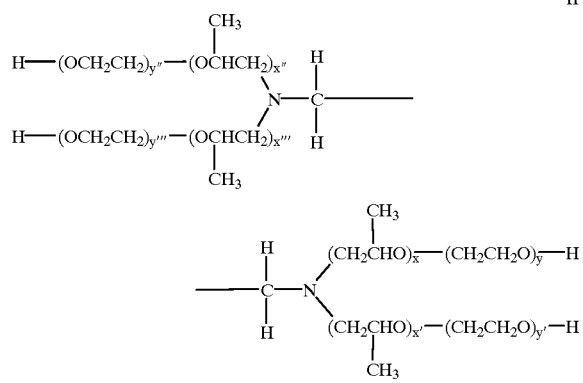

wherein the values of x, x',x",x"', y, y', y", and y"' are each such that the total molecular weight of the polypropylene oxide blocks of the compound is from about 3,900 to about 4,500, the ethylene oxide segments make up from about 35 to about 45 percent by weight of the compound, the average number of propylene oxide groups per molecule is from about 67 to about 78, and the total molecular weight is from about 6,500 to about 7,500; (4) those of formula II wherein the values of x, x', x", x"', y, y', y", and y"' are each such that the total molecular weight of the polypropylene oxide blocks of the compound is from about 2,500 to about 3,600, the ethylene oxide segments make up from about 35 to about 45 percent by weight of the compound, the average number of propylene oxide groups per molecule is from about 43 to about 62, and the total molecular weight is from about 4,150 to about 6,000; (5) those of formula III

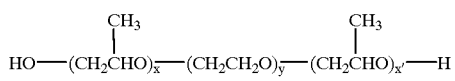

wherein the values of x, x', and y are each such that the molecular weight of the polypropylene oxide block of the compound is from about 800 to about 1,200, the ethylene oxide segments make up from about 45 to about 55 percent by weight of the compound, the average number of propylene oxide groups per molecule is from about 13 to about 21, and the total molecular weight is from about 1,600 to about 2,400; or (6) mixtures thereof, and (c) a dye selected from (1) C.I. Solvent Black 29; (2) C.I. Solvent Blue 70; (3) C.I. Solvent Blue 25; (4) C.I. Solvent Yellow 82; (5) C.I. Solvent Yellow 29; (6) C.I. Solvent Red 49; or (7) mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin,* Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.,* vol. 65, no. 9 (May 1, 1989) and references therein, the disclosure of which is totally incorporated herein by reference.

U.S. Pat. No. 4,680,332 (Hair et al.), the disclosure of which is totally incorporated herein by reference, discloses a heterophase ink composition comprising a water insoluble polymer dispersed in a liquid medium, the polymer containing therein an oil soluble dye and a nonionic stabilizer permanently attached thereto.

While known compositions and processes are suitable for their intended purposes, a need remains for improved ink compositions suitable for use in ink jet printing processes. In addition, a need remains for ink compositions suitable for use in thermal ink jet printing processes. Further, a need remains for ink compositions that generate images which exhibit improved resistance to dry smearing. Additionally, a need remains for ink compositions that generate images which exhibit improved resistance to wet smearing. There is also a need for ink compositions that generate images which exhibit improved resistance to smearing when a highlighter is passed thereover. In addition, there is a need for ink compositions with improved waterfastness. Further, there is a need for water-based ink compositions containing water insoluble dyes. Additionally, there is a need for water-based ink compositions suitable for ink jet printing which exhibit a wide color gamut.

SUMMARY OF THE INVENTION

It is an object of the present invention to provide ink compositions with the above noted advantages.

It is another object of the present invention to provide improved ink compositions suitable for use in ink jet printing processes.

It is yet another object of the present invention to provide ink compositions suitable for use in thermal ink jet printing processes.

It is still another object of the present invention to provide ink compositions that generate images which exhibit improved resistance to dry smearing.

Another object of the present invention is to provide ink compositions that generate images which exhibit improved resistance to wet smearing.

Yet another object of the present invention is to provide ink compositions that generate images which exhibit improved resistance to smearing when a highlighter is passed thereover.

Still another object of the present invention is to provide ink compositions with improved waterfastness.

It is another object of the present invention to provide water-based ink compositions containing water insoluble dyes.

It is yet another object of the present invention to provide water-based ink compositions suitable for ink jet printing which exhibit a wide color gamut.

These and other objects of the present invention (or specific embodiments thereof) can be achieved by providing an ink composition which comprises (a) water, (b) a surfactant selected from (1) those of formula I

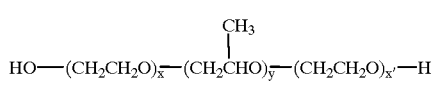

wherein the values of x, x', and y are each such that the molecular weight of the polypropylene oxide block of the compound is from about 900 to about 1,050, the ethylene oxide segments make up from about 45 to about 55 percent by weight of the compound, the average number of propylene oxide groups per molecule is from about 15 to about 18, and the total molecular weight is from about 1,800 to about 2,000; (2) those of formula I wherein the values of x, x', and y are each such that the molecular weight of the polypropylene oxide block of the compound is from about 3,000 to about 3,600, the ethylene oxide segments make up from about 35 to about 45 percent by weight of the compound, the average number of propylene oxide groups per molecule is from about 51 to about 62, and the total molecular weight is from about 5,000 to about 6,000; (3) those of formula II

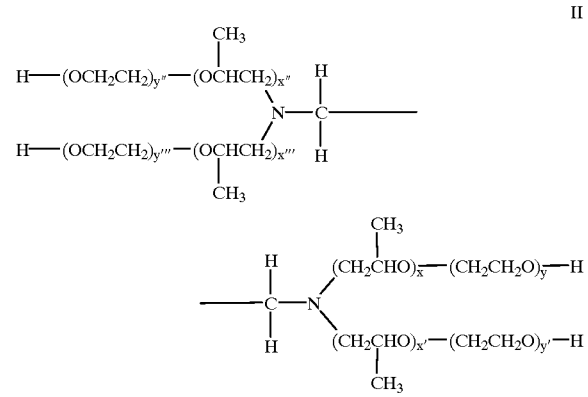

wherein the values of x, x', x", x''', y, y', y", and y''' are each such that the total molecular weight of the polypropylene oxide blocks of the compound is from about 3,900 to about 4,500, the ethylene oxide segments make up from about 35 to about 45 percent by weight of the compound, the average number of propylene oxide groups per molecule is from about 67 to about 78, and the total molecular weight is from about 6,500 to about 7,500; (4) those of formula II wherein the values of x, x', x", x''', y, y', y", and y''' are each such that the total molecular weight of the polypropylene oxide blocks of the compound is from about 2,500 to about 3,600, the ethylene oxide segments make up from about 35 to about 45 percent by weight of the compound, the average number of propylene oxide groups per molecule is from about 43 to about 62, and the total molecular weight is from about 4,150 to about 6,000; (5) those of formula III

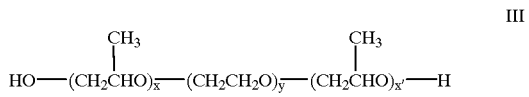

wherein the values of x, x', and y are each such that the molecular weight of the polypropylene oxide block of the compound is from about 800 to about 1,200, the ethylene oxide segments make up from about 45 to about 55 percent by weight of the compound, the average number of propylene oxide groups per molecule is from about 13 to about 21, and the total molecular weight is from about 1,600 to about 2,400; or (6) mixtures thereof, and (c) a dye selected from (1) C.I. Solvent Black 29; (2) C.I. Solvent Blue 70; (3) C.I. Solvent Blue 25; (4) C.I. Solvent Yellow 82; (5) C.I. Solvent Yellow 29; (6) C.I. Solvent Red 49; or (7) mixtures thereof.

DETAILED DESCRIPTION OF THE INVENTION

The present invention is directed to an ink composition which comprises an aqueous liquid vehicle, one or more specific surfactants, and one or more specific dyes. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The ink compositions of the present invention also contain a water insoluble dye. Examples of water insoluble dyes include C.I. Solvent Black 29, commercially available from Orient Chemical Co., Springfield, N.J., as Solvent Dye Orient Black 3808; C.I. Solvent Blue 70, commercially available from Orient Chemical Co. as Solvent Dye Orient Blue 2606; C.I. Solvent Blue 25, commercially available from Orient Chemical Co. as Solvent Dye Orient Blue BOS; C.I. Solvent Yellow 82, commercially available from Orient Chemical Co. as Solvent Dye Orient Yellow 4120; C.I. Solvent Yellow 29, commercially available from Orient Chemical Co. as Solvent Dye Orient Yellow 129; C.I. Solvent Red 49, commercially available from Orient Chemical Co. as Solvent Dye Orient Pink 312; and mixtures thereof. The dye is present in the ink in any desired or effective amount for obtaining the desired color, typically in an amount of from about 1 to about 10 percent by weight of the ink, preferably from about 2 to about 7 percent by weight of the ink, and more preferably from about 5 to about 6 percent by weight of the ink, although the amount can be outside of these ranges.

The ink compositions of the present invention further contain a surfactant. Examples of suitable surfactants include polyethylene oxide-polypropylene oxide-polyethylene oxide triblock copolymers, including those formed by the controlled addition of propylene oxide to the two hydroxyl groups of propylene glycol, followed by addition of ethylene oxide, such as those of the general formula

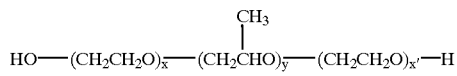

wherein x, x', and y are each integers representing the number of repeating monomer units, such as PLURONIC L35, commercially available from BASF, Mount Olive, N.J., wherein the values of x, x', and y are each such that the molecular weight of the polypropylene oxide block of the compound is from about 900 to about 1,050, and the ethylene oxide segments make up from about 45 to about 55 percent by weight of the compound (average number of propylene oxide groups per molecule from about 15 to about 18, total molecular weight from about 1,800 to about 2,400); and PLURONIC P104, commercially available from BASF, wherein the values of x, x', and y are each such that the molecular weight of the polypropylene oxide block of the compound is from about 3,000 to about 3,600 and the ethylene oxide segments make up from about 35 to about 45 percent by weight of the compound (average number of propylene oxide groups per molecule from about 51 to about 62, total molecular weight from about 5,000 to about 6,000). Also suitable as surfactants are tetrafunctional block copolymers derived from the sequential addition of propylene oxide and ethylene oxide to ethylenediamine, such as those of the general formula

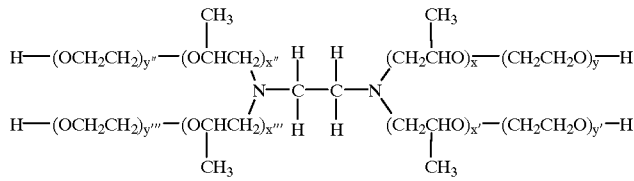

wherein x, x', x", x''', y, y', y", and y''' are each integers representing the number of repeating monomer units, such as TETRONIC 904, commercially available from BASF, wherein the values of x, x', x", x''', y, y', y", and y''' are each such that the total molecular weight of the polypropylene oxide blocks of the compound is from about 3,900 to about 4,500 and the ethylene oxide segments make up from about 35 to about 45 percent by weight of the compound (average number of propylene oxide groups per molecule from about 67 to about 78 (typically from about 16 to about 20 repeating units per chain, with four chains per molecule), total molecular weight from about 6,500 to about 7,500), and TETRONIC 704, commercially available from BASF, wherein the values of x, x', x", x''', y, y', y", and y''' are each such that the total molecular weight of the polypropylene oxide blocks of the compound is from about 2,500 to about 3,600 and the ethylene oxide segments make up from about 35 to about 45 percent by weight of the compound (average number of propylene oxide groups per molecule from about 43 to about 62 (typically from about 13 to about 15 repeating units per chain, with four chains per molecule), total molecular weight from about 4,150 to about 6,000). Also suitable as surfactants are polypropylene oxide-polyethylene oxide-polypropylene oxide triblock copolymers, including those formed by the addition of ethylene oxide to ethylene glycol, followed by addition of propylene oxide, such as those of the general formula

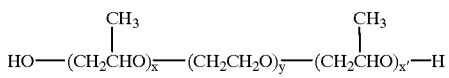

wherein x, x', and y are each integers representing the number of repeating monomer units, such as PLURONIC 10R-5, wherein the values of x, x', and y are each such that the molecular weight of the polypropylene oxide blocks of the compound is from about 800 to about 1,200 and the ethylene oxide segments make up from about 45 to about 55 percent by weight of the compound (average number of propylene oxide groups per molecule from about 13 to about 21, total molecular weight from about 1,600 to about 2,400), commercially available from BASF. Further information regarding the synthesis and structure of the TETRONICS and PLURONICS materials is disclosed in, for example, U.S. Pat. No. 4,062,907, U.S. Pat. No. 5,114,755, U.S. Pat. No. 5,001,165, U.S. Pat. No. 4,536,254, U.S. Pat. No. 4,670,058, U.S. Pat. No. 4,578,150, U.S. Pat. No. 5,078,781, U.S. Pat. No. 5,634,986, U.S. Pat. No. 5,653,970, U.S. Pat. No. 3,337,463, and U.S. Pat. No. 2,979,528, the disclosures of each of which are totally incorporated herein by reference. Mixtures of two or more of these surfactants are also suitable for the inks of the present invention. The surfactant is present in the ink in any desired or effective amount, typically being present in an amount of from about 1 to about 30 percent by weight of the ink, preferably from about 5 to about 25 percent by weight of the ink, and more preferably from about 10 to about 20 percent by weight of the ink, although the amount can be outside of these ranges.

The association properties of the above surfactants are such that at low concentrations, they exist in solution as individual coils (unimers). Thermodynamically stable micelles are formed with increasing surfactant concentration. These micellar solutions are present in the inks of the present invention. The inks appear clear to the eye, but under intense collimated light, the scattering typical of micellar solutions is observed. When the inks of the present invention are observed under 1,000X magnification, no particles are visible.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

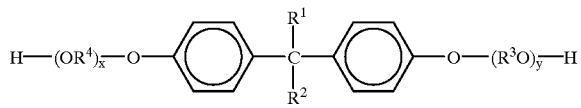

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.,* C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, particularly for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating the ink of the present invention into an ink jet printing apparatus and causing droplets of the ink to be ejected in an imagewise pattern onto a recording sheet. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink was prepared as follows: 3 grams of C.I. Solvent Black 24 dye (obtained from Orient Chemical Corporation, Springfield, N.J.) were added to 20 grams of Pluronic P104 surfactant (obtained from BASF, Mount Olive, N.J.) and mixed gently while heating at 60° C. until all the dye was completely dissolved. Thereafter, 71 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE II

An ink was prepared as follows: 1.8 grams of C.I. Solvent Blue 70 dye (obtained from Orient Chemical Corporation, Springfield, N.J.) were added to 16.7 grams of Tetronic T904 surfactant (obtained from BASF, Mount Olive, N.J.) and mixed gently while heating at 60° C. until all of dye was completely dissolved. Thereafter, 75.5 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE III

An ink was prepared as follows: 2.0 grams of C.I. Solvent Yellow 82 dye (obtained from Orient Chemical Corporation, Springfield, N.J.) were added to 20 grams of Tetronic T904 surfactant (obtained from BASF, Mount Olive, N.J.) and mixed gently while heating at 60° C. until all of the dye was completely dissolved. Thereafter, 72.0 grams of distilled water mixed with 5 grams of ethylene glycol (obtained from Aldrich Chemical Company, Milwaukee, Wis.) were slowly added too the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE IV

An ink was prepared as follows: 1.8 grams of C.I. Solvent Yellow 29 dye (obtained from Orient Chemical Corporation, Springfield, N.J.) were added to 16.7 grams of Tetronic T904 surfactant (obtained from BASF, Mount Olive, N.J.) and mixed gently while heating at 60° C. until all of the dye was completely dissolved. Thereafter, 75.5 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were

EXAMPLE V

An ink was prepared as follows: 1.8 grams of C.I. Solvent Red 49 dye (obtained from Orient Chemical Corporation, Springfield, N.J.) were added to 16.7 grams of Tetronic T904 surfactant (obtained from BASF, Mount Olive, N.J.) and mixed gently while heating at 600° C. until all of the dye was completely dissolved. Thereafter, 75.5 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE VI

An ink was prepared as follows: 2.0 grams of C.I. Solvent Red 49 dye (obtained from Orient Chemical Corporation, Springfield, N.J.) were added to 20 grams of Pluronic P104 surfactant (obtained from BASF, Mount Olive, N.J.) and mixed gently while heating at 60° C. until all of the dye was completely dissolved. Thereafter, 72.0 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE VII

An ink was prepared as follows: 2.0 grams of C.I. Solvent Red 49 dye (obtained from Orient Chemical Corporation, Springfield, N.J.) were added to 20 grams of Tetronic T704 surfactant (obtained from BASF, Mount Olive, N.J.) and mixed gently while heating at 60° C. until all of the dye was completely dissolved. Thereafter, 72.0 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE VIII

Ank was prepared as follows: 2.7 grams of C.I. Solvent Black 29 dye (obtained from Orient Chemical Corporation, Springfield, N.J.) was added to 16.7 gram of Tetronic T904 surfactant (obtained from BASF, Mount Olive, N.J.) and mixed gently while heating at 60° C. until all of the dye was completely dissolved. Thereafter, 76.4 gram of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE IX

An ink was prepared as follows: 2.0 grams of C.I. Solvent Blue 70 dye (obtained from Orient Chemical Corporation, Springfield, N.J.) were added to 20 grams of Pluronic P104 surfactant (obtained from BASF, Mount Olive, N.J.) and mixed gently while heating at 60° C. until all of the dye was completely dissolved. Thereafter, 70.0 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE X

An ink was prepared as follows: 2.0 grams of C.I. Solvent Yellow 82 dye (obtained from Orient Chemical Corporation, Springfield, N.J.) were added to 20 grams of Pluronic P104 surfactant (obtained from BASF, Mount Olive, N.J.) and mixed gently while heating at 60° C. until all of the dye was completely dissolved. Thereafter, 72.0 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

EXAMPLE XI

An ink was prepared as follows: 2.0 grams of C.I. Solvent Yellow 29 dye (obtained from Orient Chemical Corporation, Springfield, N.J.) were added to 20 grams of Pluronic P104 surfactant (obtained from BASF, Mount Olive, N.J.) and mixed gently while heating at 60° C. until all of the dye was completely dissolved. Thereafter, 72.0 grams of distilled water mixed with 5 grams of ethylene glycol (obtained from Aldrich Chemical Company, Milwaukee, Wis.) were slowly added to the mixture and heating was continued until all of the water/ethylene glycol mixture was added. The heat source was then turned off and the ink was mixed until cooled. Subsequently, 0.5 gram of TRIS (tris (hydroxymethyamino)methane) (obtained from American Biorganics Inc., Niagara Falls, N.Y.), 0.35 gram of Versene EDTA (obtained from Dow Chemical, Midland, Mich.), 0.05 gram of polyethylene oxide (obtained from Polysciences, Niles, Ill.), and 0.1 gram of Dowicil 150/250 biocide (obtained from Dow Chemical, Midland, Mich.) were added during a final 10 minutes of mixing. The ink was then filtered through a 1.2 micron Millipore (Bedford, Mass.) syringe filter to remove any residual undissolved materials.

The ink composition thus prepared was incorporated into a XEROX® Home Centre ink jet printer and images were generated on XEROX® 4024 paper, XEROX® Image Series paper, Courtland 4024DP paper, and transparency stock. The ink jetted well and generated good quality prints.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (a) water, (b) a surfactant selected from (1) those of formula I

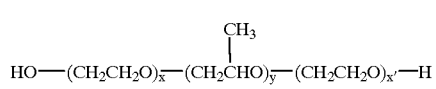

wherein the values of x, x', and y are each such that the molecular weight of the polypropylene oxide block of the compound is from about 900 to about 1,050, the ethylene oxide segments make up from about 45 to about 55 percent by weight of the compound, the average number of propylene oxide groups per molecule is from about 15 to about 18, and the total molecular weight is from about 1,800 to about 2,000; (2) those of formula I wherein the values of x, x', and y are each such that the molecular weight of the polypropylene oxide block of the compound is from about 3,000 to about 3,600, the ethylene oxide segments make up from about 35 to about 45 percent by weight of the compound, the average number of propylene oxide groups per molecule is from about 51 to about 62, and the total molecular weight is from about 5,000 to about 6,000; (3) those of formula II

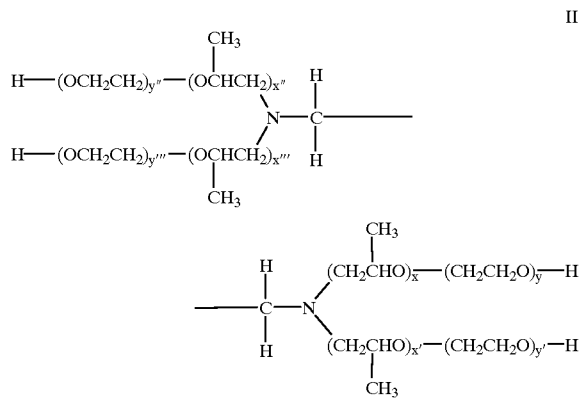

wherein the values of x, x', x", x''', y, y', y", and y''' are each such that the total molecular weight of the polypropylene oxide blocks of the compound is from about 3,900 to about 4,500, the ethylene oxide segments make up from about 35 to about 45 percent by weight of the compound, the average number of propylene oxide groups per molecule is from about 67 to about 78, and the total molecular weight is from about 6,500 to about 7,500; (4) those of formula II wherein the values of x, x', x", x''', y, y', y", and y''' are each such that the total molecular weight of the polypropylene oxide blocks of the compound is from about 2,500 to about 3,600, the ethylene oxide segments make up from about 35 to about 45 percent by weight of the compound, the average number of propylene oxide groups per molecule is from about 43 to about 62, and the total molecular weight is from about 4,150 to about 6,000; (5) those of formula III

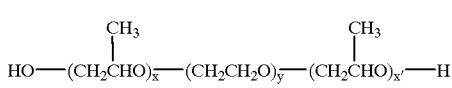

wherein the values of x, x', and y are each such that the molecular weight of the polypropylene oxide block of the compound is from about 800 to about 1,200, the ethylene oxide segments make up from about 45 to about 55 percent by weight of the compound, the average number of propylene oxide groups per molecule is from about 13 to about 21, and the total molecular weight is from about 1,600 to about 2,400; or (6) mixtures thereof, and (c) a dye selected from (1) C.I. Solvent Black 29; (2) C.I. Solvent Blue 70; (3) C.I. Solvent Blue 25; (4) C.I. Solvent Yellow 82; (5) C.I. Solvent Yellow 29; (6) C.I. Solvent Red 49; or (7) mixtures thereof.

2. An ink composition according to claim 1 wherein the dye is present in the ink in an amount of from about 1 to about 10 percent by weight.

3. An ink composition according to claim 1 wherein the surfactant is present in the ink in an amount of from about 1 to about 30 percent by weight.

4. An ink composition according to claim 1 wherein the dye is Solvent Dye Orient Black 3808. Solvent Dye Orient Blue 2606, Solvent Dye Orient Blue BOS, Solvent Dye Orient Yellow 4120, Solvent Dye Orient Yellow 129, Solvent Dye Orient Pink 312, or mixtures thereof.

5. An ink composition according to claim 1 wherein the dye is C.I. Solvent Black 29 and the surfactant is of formula I wherein the values of x, x', and y are each such that the molecular weight of the polypropylene oxide block of the compound is from about 3,000 to about 3,600, the ethylene oxide segments make up from about 35 to about 45 percent by weight of the compound, the average number of propylene oxide groups per molecule is from about 51 to about 62, and the total molecular weight is from about 5,000 to about 6,000.

6. An ink composition according to claim 1 wherein the dye is C.I. Solvent Blue 70 and the surfactant is of formula II wherein the values of x, x', x", x"', y, y', y", and y"' are each such that the total molecular weight of the polypropylene oxide blocks of the compound is from about 2,500 to about 3,600, the ethylene oxide segments make up from about 35 to about 45 percent by weight of the compound, the average number of propylene oxide groups per molecule is from about 43 to about 62, and the total molecular weight is from about 4,150 to about 6,000.

7. An ink composition according to claim 1 wherein the dye is C.I. Solvent Yellow 82 and the surfactant is of formula II wherein the values of x, x', x", x"', y, y', y", and y"' are each such that the total molecular weight of the polypropylene oxide blocks of the compound is from about 2,500 to about 3,600, the ethylene oxide segments make up from about 35 to about 45 percent by weight of the compound, the average number of propylene oxide groups per molecule is from about 43 to about 62, and the total molecular weight is from about 4,150 to about 6,000.

8. An ink composition according to claim 1 wherein the dye is C.I. Solvent Blue 25 and the surfactant is of formula II wherein the values of x, x', x", x"', y, y', y", and y"' are each such that the total molecular weight of the polypropylene oxide blocks of the compound is from about 3,900 to about 4,500, the ethylene oxide segments make up from about 35 to about 45 percent by weight of the compound, the average number of propylene oxide groups per molecule is from about 67 to about 78, and the total molecular weight is from about 6,500 to about 7,500.

9. An ink composition according to claim 1 wherein the dye is C.I. Solvent Yellow 29 and the surfactant is of formula II wherein the values of x, x', x", x"', y, y', y", and y"' are each such that the total molecular weight of the polypropylene oxide blocks of the compound is from about 3,900 to about 4,500, the ethylene oxide segments make up from about 35 to about 45 percent by weight of the compound, the average number of propylene oxide groups per molecule is from about 67 to about 78, and the total molecular weight is from about 6,500 to about 7,500.

10. An ink composition according to claim 1 wherein the dye is C.I. Solvent Red 49 and the surfactant is of formula II wherein the values of x, x', x", x"', y, y', y", and y"' are each such that the total molecular weight of the polypropylene oxide blocks of the compound is from about 2,500 to about 3,600, the ethylene oxide segments make up from about 35 to about 45 percent by weight of the compound, the average number of propylene oxide groups per molecule is from about 43 to about 62, and the total molecular weight is from about 4,150 to about 6,000.

11. An ink composition according to claim 1 wherein the dye is C.I. Solvent Red 49 and the surfactant is of formula II wherein the values of x, x', x", x"', y, y', y", and y"' are each such that the total molecular weight of the polypropylene oxide blocks of the compound is from about 3,900 to about 4,500, the ethylene oxide segments make up from about 35 to about 45 percent by weight of the compound, the average number of propylene oxide groups per molecule is from about 67 to about 78, and the total molecular weight is from about 6,500 to about 7,500.

12. An ink composition according to claim 1 wherein the dye is C.I. Solvent Red 49 and the surfactant is of formula I wherein the values of x, x', and y are each such that the molecular weight of the polypropylene oxide block of the compound is from about 3,000 to about 3,600, the ethylene oxide segments make up from about 35 to about 45 percent by weight of the compound, the average number of propylene oxide groups per molecule is from about 51 to about 62, and the total molecular weight is from about 5,000 to about 6,000.

13. An ink composition according to claim 1 wherein the dye is C.I. Solvent Red 49 and the surfactant is of formula III wherein the values of x, x', and y are each such that the molecular weight of the polypropylene oxide block of the compound is from about 800 to about 1,200, the ethylene oxide segments make up from about 45 to about 55 percent by weight of the compound, the average number of propylene oxide groups per molecule is from about 13 to about 21, and the total molecular weight is from about 1,600 to about 2,400.

14. An ink composition according to claim 1 wherein the dye is C.I. Solvent Black 29 and the surfactant is of formula I wherein the values of x, x', and y are each such that the molecular weight of the polypropylene oxide block of the compound is from about 900 to about 1,050, the ethylene oxide segments make up from about 45 to about 55 percent by weight of the compound, the average number of propylene oxide groups per molecule is from about 15 to about 18, and the total molecular weight is from about 1,800 to about 2,000.

* * * * *